United States Patent Office 3,148,997
Patented Sept. 15, 1964

3,148,997
CATECHOL COMPOUNDS IN IMPROVING CLAYS AND CLAY-CONTAINING MATERIALS
John B. Hemwall, Midland, Mich., assignor to The Dow Chemical Company, Midland, Mich., a corporation of Delaware
No Drawing. Filed Jan. 4, 1963, Ser. No. 249,309
9 Claims. (Cl. 106—287)

This invention relates to novel compositions and procedures for imparting unique and improved properties to clays, including soils and other clay-containing materials and to certain uses of these unique materials. More specifically, this invention relates to compositions for treatment, and resulting compositions, of clay, including soils and other clay-containing materials, with certain catechol compounds.

Clays and clay-containing materials are found naturally in various geological deposits, including soil. These materials have the properties of being dimensionally unstable and of forming fluid cohesive and adhesive mixtures in the presence of water. Conversely, upon drying, these materials become extremely dimensionally stable. While many of the uses of clay, clay soils and other clay-containing materials depend upon these properties, there are several uses for which such properties are a distinct handicap or even a complete bar.

Thus, when clay-containing soil or other clay-containing material is used as an integral constituent of the foundation, grade, base or structure in the construction of highways, runways, dams and buildings, the problem often arises that the clay-containing material loses a significant portion of its strength or load-bearing capacity in the presence of moisture or water. This is true even of materials which have been treated with common solidifying agents such as Portland cement or lime. Clay-containing soils which have been exposed to rain or irrigation water and subsequently dried often will form crusts through which plant penetration is very difficult or impossible.

In the past it has been the practice to avoid the use of the clay-containing materials, to compensate for their shortcomings by other methods, or to use them in spite of their shortcomings. Thus, in the construction industry where it is desired to make use of local soils or aggregate, the presence of excessive amounts of clay in these materials has necessitated the hauling in of materials from other locations. This operation is expensive and, furthermore, suitable materials are frequency scarce. Another alternative has been to process the clay-containing aggregate so as to remove the clay. Again, this is an expensive procedure and is not always practical. Other alternative procedures involve using engineering techniques such as reinforced concrete, extra thick bases and grades, and pilings to compensate for the inferior properties of the clay-containing materials. These techniques, however, also are expensive. The final alternative is to maintain construction costs at a minimum and to use the inferior clay-containing materials. This, of course, results in increased maintenance costs throughout the years.

For agricultural purposes, it is impossible to avoid the use of a clay-containing soil where it exists, except to retire it from agricultural production. Frequently, however, the crusting problem with such soils is mitigated by the use of crops which are more capable of penetrating through crusts, or by planting several seeds together so that by their combined effort at least one plant will emerge, or by transplanting seedlings, in which case the plant does not need to penetrate the crusted soil surface. In many cases these are quite satisfactory solutions to the crusting problem. In other cases, however, these techniques impose restrictions on the grower that he would prefer to avoid. The other alternative used, of course, is to proceed in the hope that conditions necessary to crust formation do not occur before the plants have penetrated the soil surface. While this is frequently the case, there are numerous times when it is not, and severe losses to the farmer result. Thus, there is a definite need for clay, clay soils and other clay-containing materials for use as structural material precursors which, in the presence of water, have the properties of enhanced dimensional stability and of forming less cohesive and adhesive fluid mixtures, but which, when dried, have the property of less dimensional stability. Such clays, soils and other clay-containing materials can be considered to be less water sensitive.

It is an object of the present invention to provide unique compositions for the treatment of clays, clay soils and other clay-containing materials.

It is a further object to provide a unique method of treatment of clays, clay soils and other clay-containing materials.

A further object is to provide new compositions of clays, clay soils and other clay-containing materials which are characterized by decreased water sensitivity.

Another object is to provide unique compositions for the treatment of clay soils, including soils which contain auxiliary solidifying agent such as Portland cement or lime, so that the resulting soil is better suited for various civil engineering uses.

It is a further object to provide a unique method of treatment of clay soils, including soils which contain an auxiliary solidfying agent such as Portland cement or lime, so that the resulting soil is better suited for various civil engineering uses.

A further object is to provide new compositions of clay soils, including soils which contain an auxiliary solidifying agent such as Portland cement or lime, which are better suited for various civil engineering uses.

Still another object is to provide unique compositions for the treatment of clay soils so that the treated soil is less susceptible to crust formation.

It is a further object to provide a unique method of treatment of clay soils so that the soil is less susceptible to crust formation.

A further object is to provide new compositions of clay soils which are less susceptible to crust formation.

This invention is directed to the treatment, compositions for treatment, and resulting compositions of clays and clay-containing materials with catechol compounds of the following formula

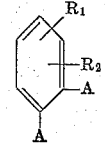

in which A is OM where M is H, $NH_4$, metal, or amine; $R_1$ is R, —OR,

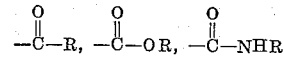

and —SR in which R is one of alkyl, aryl, alkaryl, aralkyl and cycloalkyl containing from 1 to 18 carbon atoms and from 0 to 2 chloro substituents, and $R_2$ is one of A, R, H, Cl, $NH_2$ and $COOM_2$ in which $M_2$ is H, alkali metal, $CH_3$, or $C_2H_5$; and wherein $R_1$ and $R_2$ together may be interconnected to form with the benzene ring a naphthalene ring system; and the semiquinone and quinone oxidation products of the foregoing compounds. Hereafter these compounds will be referred to broadly as catechol compounds.

The catechol compounds can be applied to the clay-containing material in several ways. The preferred way involves dispersing the catechol compound either as a suspension or a solution in a liquid medium and admixing the resulting liquid dispersion with the clay-containing material via spraying, slurrying or other suitable methods. Suitable liquids for dispersion have a boiling point up to ca. 150° C. and include water, ketones, alcohols and hydrocarbon solvents, mixtures thereof and emulsions thereof, either oil-in-water or water-in-oil, in which the amount of active emulsifying agent does not exceed 25 percent of the amount of catechol compound in the formulation.

Because of the diverse nature of the catechol compounds utilized in the practice of this invention, some types of compounds are soluble, dispersible or emulsifiable in relatively hydrophilic media, others in relatively hydrophobic media. Upon inspection of a chemical formula, the art skilled can generally determine a solvent, dispersion medium or emulsifier satisfactory for a given catechol compound. In any event, the operability and desirability of a given solvent, dispersion medium or emulsifying agent can be determined by a simple test wherein a given compound is dissolved, suspended or its solution emulsified in a given medium. Obviously, solvents, diluents and emulsifying agents are used which are inert toward the catechol compound. Hereinafter, such solutions, suspensions and emulsions will sometimes be referred to broadly as dispersions and the solvent, suspension and emulsion media will be referred to broadly as dispersion media. Advantageously, the catechol compound dispersion contains between 0.0025 and 50 weight percent of catechol compound.

Suitable clays are those classed as the kaolinitic, montmorillonitic, illitic and mixed layer type clays. Clay-containing materials are considered to be those artificial and natural materials which contain at least 5 percent by weight of any one type or mixture of such clays, dry basis. Clay-containing soils are considered to be those that contain at least 5 percent clay when analyzed for clay by the hydrometer method as described by Bouyoucos in Soil Science 44:245–246. An auxiliary solidifying agent such as lime or Portland cement in amount of from about 1 to 100 weight percent, clay material basis, is advantageous in making structural materials.

The treatment of the clay or clay-containing material with the catechol compound should result in the clay or clay-containing material containing at least 0.05 percent and advantageously up to 2 percent by weight of the catechol compound, dry clay basis. The upper limit is essentially economic. In the case of clay-containing soils these some limits hold, but are to be applied only to the actual volume of soil treated. Thus, when a catechol compound is used to decrease soil crusting, it is practical to treat only the soil immediately above the seed row. Depending upon how carefully the catechol compound is applied to this restricted volume of soil, anywhere from 0.1 pound to 10 pounds of the catechol compound is sufficient to treat one acre of crop land.

The following examples describe completely specific embodiments and the best mode contemplated by the inventor for carrying out his invention. They are not to be construed as limiting the invention, which is defined in the claims.

Example 1

Ten grams of Portland cement was intimately mixed with 200 grams of a finely ground air-dried slightly acid clay loam soil. This mixture was then brought up to a moisture content of about 17 percent by spraying water from a glass chromatography sprayer onto the soil while subjecting the soil to additional mixing. A catechol compound, as set forth below, was immediately added to the soil by spraying 10 ml. of an acetone solution containing 200 mg. of the catechol compound with continuous mixing. This treatment resulted in the soil containing 5 percent Portland cement and 0.1 percent catechol compound on a dry soil weight basis.

Once the soil had been treated, it was then separated into two equal aliquots. Each aliquot was then placed in a cylindrical molding tube 3 cm. in diameter and compressed from both ends in a hydraulic press at a pressure of 740 p.s.i. until a static condition was attained. The molded aliquot was then immediately ejected from the molding tube and placed in a 100 percent relative humidity atmosphere to cure for a period of four days, followed by a one day cure at room humidity. Next the aliquots were immersed in water for one day, after which they were tested for unconfined compressive strength, hereafter designated UCS.

The unconfined compression test is a uniaxial compression test in which a cylindrical test specimen is provided with no lateral support while undergoing vertical compression. This test is a commonly accepted test used by civil engineers to determine the suitability of any soil or treated soil to resist shear caused by the various stresses placed on it. The immersion of the test cylinders in water for one day prior to performing the test is an accepted method of assessing the stability of the soil to water.

The following data were obtained with various catechol compounds using an unconfined compression testing apparatus manufactured by Soiltest Incorporated, Model U–160. The rate of strain on the samples was about 0.07 inch per minute. The maximum stress which the samples could bear prior to failing was used to calculate the UCS of the sample via the method outlined in the manual provided by Soiltest Incorporated, entitled "Unconfined Compression Testing of Cohesive Soils," dated 1957.

In each experiment conducted to provide the data for this example, one control was included. A control was prepared in a manner exactly analogous to the other treatments except that no cathechol compound was present in the acetone added to the soil.

| Catechol compound: | UCS, p.s.i. |
|---|---|
| Control | 0 |
| 4-tert.-butylpyrocatechol | 216 |
| 4-methylpyrocatechol | 124 |
| 4-phenylpyrocatechol | 192 |
| 4-($\alpha,\alpha$-dimethylbenzyl)-pyrocatechol | 187 |
| 4-cyclohexylpyrocatechol | 134 |
| 4-sec.-butylpyrocatechol | 182 |
| 4-(1,1,3,3-tetramethylbutyl)-pryrocatechol | 178 |
| 3-phenylpyrocatechol | 186 |
| 3-cyclohexylpyrocatechol | 206 |
| 5-phenyl-o-pyrocatechuic acid, methyl ester | 168 |
| 5-phenyl-o-pyrocatechuic acid | 184 |
| 2,3,4-trihydroxybenzophenone | 94 |
| 2',3',4',-trihydroxydecanophenone | 169 |
| 2,3-naphthalenediol | 94 |
| 4'1chloro-2,3,4-trihydroxy-benzophenone | 168 |
| 2',4'-dichloro-2,3,4-trihydroxy-benzophenone | 122 |
| 3',4'-dichloro-2,3,4-trihydroxy-benzophenone | 128 |
| 2'-chloro-2,3,4-trihydroxy-benzophenone | 79 |
| 4-tert.-butyl-o-benzoquinone | 110 |
| 3',4'-dihydroxy-dodecanophenone | 151 |
| 3',4'-dihydroxy-octadecanophenone | 62 |
| 3,5-di-tert.-butylpyrocatechol | 184 |
| 4-(1,1,3,3-tetramethylbutyl - o - benzoquinone | 221 |
| 4-dodecylpyprocatechol | 150 |

Example 2

One hundred grams of a finely ground air-dried slightly acid clay loam soil was brought up to a moisture content of about 17 percent by spraying water from a glass chromatography sprayer onto the soil while subjecting the soil to thorough mixing. A catechol compound, as set forth in the following data, was immediately added to the soil by spraying on with mixing 5 ml. of an acetone solution containing 15 mg. of the compound. This treatment resulted in the soil containing 150 ppm of the catechol compound on a dry soil weight basis.

Once the soil had been treated, it was allowed to stand in the open air for at least two hours and then was dried in an oven at 30° C. overnight. The heated soil was then divided into four replicates of 20 grams each and placed into four rectangular molds 3.2 cm. wide by 6.4 cm. long. The soil in the molds was then leveled and compacted with a special compacting tool. The compacting tool has a base which covers the leveled soil sample and onto which was dropped a weight of 31.5 grams from a height of 31.5 cm. This weight was ropped repeatedly for six times, after which the soil was flooded with water. After the excess water had drained through the soil, the samples were dried overnight in an oven at 30° C. The resulting briquettes were then ready to be tested for their modulus of rupture.

The modulus of rupture (MR) is a test to determine the maximum stress that a material will withstand without breaking and is determined by subjecting a rectangular briquette to a bending moment. This test is commonly accepted by soil scientists as a measure of the crusting potential of a soil and, hence, its relative suitability as an agricultural soil. The lower the maximum stress before rupture, the less the crusting potential of the soil.

The modulus of rupture was determined on an apparatus patterned after that described by L. A. Richards in the Soil Science Society of America Proceeding 17:321–323.

In each experiment conducted to obtain the data for this example, one control was included. The control was prepared exactly analogously to the other treatments except that no catechol compound was present in the acetone added to the soil.

| Catechol compound: | MR,[1] millibars |
|---|---|
| Control | 4500 |
| 4-tert.-butylpyrocatechol | 0 |
| 4-methylpyrocatechol | 2550 |
| 4-phenylpyrocatechol | 3940 |
| 4-(α,α-dimethylbenzyl)-pyrocatechol | 1930 |
| 4-cyclohexylpyrocatechol | 2150 |
| 4-sec.-butylpyrocatechol | 1840 |
| 4-(1,1,3,3-tetramethylbutyl)-pyrocatechol | 0 |
| 3phenylpyrocatechol | 3220 |
| 3-cyclohexylpyrocatechol | 1560 |
| 5-phenyl-o-pyrocatechuic acid, methyl ester | 2930 |
| 5-phenyl-o-pyrocatechuic acid | 2860 |
| 2,3,4-trihydroxybenzophenone | 3670 |
| 2',3',4'-trihydroxydecanophenone | 0 |
| 2,3-p-cymenediol | 3200 |
| 2,3-naphthalenediol | 1000 |
| 4'-chloro-2,3,4-trihydroxy-benzophenone | 1350 |
| 2',4' - dichloro - 2,3,4 - trihydroxy-benzophenone | 3850 |
| 3',4' - dichloro - 2,3,4 - trihydroxy-benzophenone | 1588 |
| 2'-chloro-2,3,4-trihydroxy-benzophenone | 3413 |
| 4-tert.-butyl-o-benzoquinone | 2200 |
| 3',4-dihydroxy-dodecanophenone | 0 |
| 3',4'-dihydroxy-octadecanophenone | 1500 |
| 3,5-di-tert.-butylpyrocatechol | 1500 |
| 4-1,1,3,3 - tetramethylbutyl) - o - benzoquinone | 1200 |
| 4-dodecylpyrocatechol | 0 |
| 4-octadecylpyrocatechol | 600 |

[1] MR in millibars=$3FL/2000\ bd^2$ where F is the breaking force in dynes, L is the distance between the bars supporting the briquette, b is the width and d is the thickness of the briquette, L, b and d being expressed in centimeters.

*Example 3*

Nine 200-gram samples of a finely ground air-dried slightly acid clay loam soil were prepared. Four grams of lime, Ca(OH)$_2$, was then intimately mixed with each sample. Each sample was then sprayed with 20 ml. of water. Finally each sample was sprayed and mixed with 10 ml. of an acetone solution which contained either no catechol compound (control) or 200 mgm. of one of the eight compounds listed below. These various samples were then compressed into plugs, cured and tested by the method of Example 1. The results presented below are in terms of the UCS of the various treatments. The various treatments contain 0.1 percent of the indicated test chemical.

| Catechol compound: | UCS, p.s.i. |
|---|---|
| Standard lime treatment without chemical (control) | 140 |
| 4-methylpyrocatechol | 154 |
| 4-phenylpyrocatechol | 171 |
| 4-tert.-butylpyrocatechol | 173 |
| 4-(α,α-dimethylbenzyl)pyrocatechol | 185 |
| 4-cyclohexylpyrocatechol | 218 |
| 4-(1,1,3,3-tetramethylbutyl)pyrocatechol | 207 |
| 2',3',4'-trihydroxydecanophenone | 216 |
| 2,3-naphthalenediol | 175 |

*Example 4*

The following solutions were prepared and used in this example and in following Example 5:

(1) 0.5 gram of 4-tert.-butylpyrocatechol, hereafter TBC, and 0.24 gram of NaOH were dissolved in 25 ml. of water.

(2) 0.50 gram of TBC and 0.34 gram of KOH were dissolved in 25 ml. of water.

(3) 1.00 gram of TBC and 1.08 grams of FeCl$_3$·6H$_2$O were added to 10–15 ml. of acetone. Next 0.48 gram of NaOH dissolved in 5 ml. of methanol was added to the acetone. Then this mixture was centrifuged and the precipitate containing NaCl was separated from the supernatant which contained the iron salt or complex of 4-tert.-butylpyrocatechol. This supernatant was diluted to 50 ml. and aliquots of it were used in subsequent experiments.

(4) 1.00 gram of TBC and 0.82 gram of CuCl$_2$·2H$_2$O were added to 10–15 ml. of acetone. Next 0.48 gram of NaOH dissolved in 5 ml. of methanol was added to the acetone. Then this mixture was centrifuged and the precipitate containing NaCl was separated from the supernatant which contained the copper salt or complex of 4-tert.-butylpyrocatechol. This supernatant was diluted to 50 ml. and aliquots of it were used in subsequent experiments.

(5) 1.00 gram of TBC and 0.82 gram of ZnCl$_2$ were added to 10–15 ml. of acetone. Next 0.48 gram of NaOH dissolved in 5 ml. of methanol was added to the acetone. Then this mixture was centrifuged and the precipitate containing NaCl was separated from the supernatant which contained the zinc salt or complex of 4-tert.-butylpyrocatechol. This supernatant was diluted to 50 ml. and aliquots of it were used in subsequent experiments.

(6) 1.00 gram of TBC and 0.52 gram of AlCl$_3$ were added to 10–15 ml. of acetone. Next 0.48 gram of NaOH dissolved in 5 ml. of methanol was added to the acetone. Then this mixture was centrifuged and the precipitate containing NaCl was separated from the supernatant which contained the aluminum salt or complex of 4-tert.-butylpyrocatechol. This supernatant was diluted to 50 ml. and aliquots of it were used in subsequent experiments.

(7) 1.00 gram of TBC and 1.12 grams of ThCl$_4$ were added to 10–15 ml. of acetone. Next 0.48 gram of NaOH dissolved in 5 ml. of methanol was added to the acetone. Then this mixture was centrifuged and the precipitate containing NaCl was separated from the supernatant which contained the thorium salt or complex of 4-tert.-butylpyrocatechol. This supernatant was diluted to 50 ml. and aliquots of it were used in subsequent experiments.

(8) 1.00 gram of TBC and 0.88 gram of $CaCl_2 \cdot 2H_2O$ were added to 10–15 ml. of acetone. Next 0.48 gram of NaOH dissolved in 5 ml. of methanol was added to the acetone. Then this mixture was centrifuged and the precipitate containing NaCl was separated from the supernatant which contained the calcium salt or complex of 4-tert.-butylpyrocatechol. This supernatant was diluted to 50 ml. and aliquots of it were used in subsequent experiments.

(9) 1.00 gram of TBC and 0.96 gram of $NH_4NO_3$ were added to 10–15 ml. of acetone. Next 0.48 gram of NaOH dissolved in 5 ml. of methanol was added to the acetone. Then this mixture was centrifuged and the precipitate containing $NaNO_3$ was separated from the supernatant which contained the ammonium salt of 4-tert.-butylpyrocatechol. This supernatant was diluted to 50 ml. and aliquots of it were used in subsequent experiments.

Nine 200-gram samples of a finely ground air-dried slightly acid clay loam soil were prepared. Ten grams of Portland cement was then mixed with each sample. Next, water was sprayed onto each sample until it contained about 16 percent water. Ten ml. quantities of the above solutions except solution numbered 1 were then sprayed onto and mixed with individual samples of the soil. In addition, one control was treated with 10 ml. of acetone which contained no chemical. These various treated samples were then compressed into plugs, cured and tested for UCS by the method of Example 1. The results presented below are in terms of the UCS of the various catechol compound treatments. All treatments except the control contained the equivalent of 0.1 percent TBC.

| Catechol compound: | UCS, p.s.i. |
|---|---|
| Control | 0 |
| K, TBC | 102 |
| Fe, TBC | 86 |
| Cu, TBC | 68 |
| Zn, TBC | 41 |
| Al, TBC | 43 |
| Th, TBC | 43 |
| Ca, TBC | 76 |
| $NH_4$, TBC | 107 |

*Example 5*

Ten 100-gram samples of a finely ground air-dried slightly acid clay loam soil were prepared. Ten grams of water was then added to each sample. Two ml. of each of the solutions prepared in Example 4 were diluted to 10 ml. with acetone, and the resulting solutions were sprayed onto and mixed with separate samples of the soil. In addition, one sample of soil was treated with 10 ml. of acetone which contained no catechol compound and served as a control. The treated samples were then made into briquettes and the resulting briquettes tested for modulus of rupture as described in Example 2. The results presented below are in terms of the modulus of rupture of the various treatments. All treatments except the standard treatment contain the equivalent of 400 p.p.m. 4-tert.-butylpyrocatechol.

| Catechol compound: | MR, millibars |
|---|---|
| Control | 4270 |
| Na, TBC | 0 |
| K, TBC | 2580 |
| Fe, TBC | 3120 |
| Cu, TBC | 0 |
| Zn, TBC | 0 |
| Al, TBC | 0 |
| Th, TBC | 0 |
| Ca, TBC | 0 |
| $NH_4$, TBC | 0 |

*Example 6*

Ten 200-gram samples of a finely ground air-dried slightly acid clay loam soil were prepared. Water was sprayed onto each sample until it contained 12.5 percent water. Each sample was then sprayed and mixed with 10 ml. of an acetone solution which contained either no chemical (control) or 200 mgm. of one of the nine test catechol compounds listed below. These various samples were then compressed into plugs, cured and tested by the method of Example 1. The results presented below are in terms of the UCS of the various treatments.

| Catechol Compound | Percent Catechol Compound in Soil | UCS, p.s.i. |
|---|---|---|
| Control | | 0 |
| 4-methylpyrocatechol | 0.1 | 16 |
| 4-phenylpyrocatechol | 0.1 | 15 |
| TBC | 0.1 | 19 |
| 4-(α,α-dimethylbenzyl)pyrocatechol | 0.1 | 17 |
| 4-cyclohexylopyrocatechol | 0.1 | 14 |
| 4-sec.-butylpyrocatechol | 0.1 | 17 |
| 4-(1,1,3,3-tetramethylbutyl)pyrocatechol | 0.1 | 16 |
| 2',3',4'-trihydroxydecanophenone | 0.1 | 16 |
| 2,3-naphthalenediol | 0.1 | 11 |

*Example 7*

Ten grams of Portland cement was intimately mixed with 200 grams of a finely ground air-dried slightly acid clay loam soil. This mixture was then brought up to a moisture content of 20 percent by spraying water onto the soil. Similar soil-cement mixtures were prepared which contained 18 percent, 16 percent and 14 percent moisture. Each of the above treatments was duplicated so that one of each could be treated with 2 grams of TBC dissolved in 10 ml. of acetone. These treatments resulted in a soil containing 5 percent Portland cement (control) and one containing 5 percent Portland cement plus 1 percent of TBC. These various mixtures were then compressed into plugs, cured and tested for UCS by the method of Example 1. The results presented below are in terms of the UCS of the various mixtures.

| Percent Initial Moisture Content | Catechol Compound | UCS, p.s.i. |
|---|---|---|
| 20 | Control | 43 |
| 20 | 1% TBC | 68 |
| 18 | Control | 76 |
| 18 | 1% TBC | 109 |
| 16 | Control | 91 |
| 16 | 1% TBC | 192 |
| 14 | Control | 68 |
| 14 | 1% TBC | 220 |

It is apparent from the above results that at all the moisture contents tried, the addition of 1 percent catechol compound gave results far superior to that of the control. It is further evident that at lower moisture contents the superiority obtained with catechol compound addition was greatest. Thus, catechol compound treatment offers an additional advantage in that less moisture is needed in Portland cement-stabilized soils to obtain maximum strength from the cement.

*Example 8*

Three 200-gram samples of a finely ground air-dried slightly acid clay loam soil were prepared. One sample had 10 grams of Portland cement added with mixing, which was followed by spraying and mixing with 2 grams of TBC dissolved in 10 ml. of acetone, and finally was sprayed with 28 ml. of water. A second sample had 10 grams of Portland cement added with mixing, which was followed by spraying with 28 ml. of water, and finally was sprayed and mixed with 2 grams of TBC dissolved in 10 ml. of acetone. The third sample was mixed with 2 grams of TBC dissolved in 10 ml. of acetone sprayed on, followed by the addition of 10 grams of Portland cement, and finally was sprayed with 28 ml. of water. These various treatments were then compressed into plugs, cured and tested for UCS by the method of Example 1. The results presented below are in terms of the UCS of the various treated samples.

Treatment order: UCS, p.s.i.
    Dry soil+cement+TBC+water _____ 270
    Dry soil+cement+water+TBC _____ 289
    Dry soil+TBC+cement+water _____ 244

It is apparent from the above results that the order of incorporation of the catechol compound with the soil and the other additives is not too critical. Thus, the compound can be added to the soil at whatever time is most consistent with normal operating procedures.

*Example 9*

Two 200-gram samples of each of the following soils were finely ground and air-dried.

| Soil | Mechanical Analysis | | | pH | Percent Organic Matter | Percent CaCO$_3$ |
|---|---|---|---|---|---|---|
| | Percent Clay | Percent Silt | Percent Sand | | | |
| B | 26 | 47 | 27 | 5.6 | 9.3 | 0 |
| E | 34 | 46 | 20 | 7.7 | 1.2 | 4.5 |
| F | 37 | 38 | 25 | 6.6 | 1.8 | 0 |

Ten grams of Portland cement was then mixed with both samples of all soils. Water was then sprayed onto both samples of each soil until Soil B contained 25 percent moisture, Soil E contained 14 percent moisture and Soil F contained 14 percent moisture. Next, two grams of TBC dissolved in 10 ml. of acetone was sprayed onto one sample of each soil. These various soil samples were then compressed into plugs, cured and tested for UCS by the method of Example 1. The results presented below are in terms of the UCS of the various treatments.

| Soil | Treatment | UCS, p.s.i. |
|---|---|---|
| B | 5% cement | 0 |
| B | 5% cement + 1% TBC | 65 |
| E | 5% cement | 42 |
| E | 5% cement + 1% TBC | 130 |
| F | 5% cement | 79 |
| F | 5% cement + 1% TBC | 153 |

It is apparent from the above results that on soils of rather widely varying characteristics the presence of a catechol compound enhances the strength of the soil when stabilized with Portland cement.

*Example 10*

Seven 200-gram samples of a finely ground air-dried slightly acid clay loam soil were prepared. Ten grams of Portland cement was then mixed with each sample. Next, water was sprayed onto each sample until it contained 16 percent water. Each sample was then sprayed and mixed with 10 ml. of acetone that contained either 0, 0.1, 0.2, 1.0, 2.0, 3.0 or 4.0 grams of TBC. These various samples were then compressed into plugs, cured and tested by the method of Example 1. The results presented below are in terms of the UCS of the various treatments.

TBC in soil: USC, p.s.i.
    0.00 _____ 85
    0.05 _____ 165
    0.10 _____ 157
    0.50 _____ 149
    1.00 _____ 188
    1.50 _____ 212
    2.00 _____ 226

It is apparent from the above results that the presence of a catechol compound in varying amounts in the soil enhances the strength of soil stabilized with Portland cement.

*Example 11*

Five 100-gram samples of each of the following soils were finely ground and air-dried.

| Soil | Mechanical Analysis | | | pH | Percent Organic Matter |
|---|---|---|---|---|---|
| | Percent Clay | Percent Silt | Percent Sand | | |
| D | 6 | 30 | 64 | 5.8 | 0.6 |
| N | 32 | 24 | 44 | 7.4 | 2.0 |
| F | 37 | 38 | 25 | 6.6 | 1.8 |

Water was then sprayed onto each sample of each soil until Soil D contained 5 percent moisture, Soil N contained 6 percent moisture and Soil F contained 7 percent moisture. Each sample of each soil was then sprayed and mixed with 10 ml. of an acetone solution that contained either 0, 5, 10, 20 or 30 mg. of 4-tert.-butylpyrocatechol. The various treated samples were then made into briquettes and the resulting briquettes tested for modulus of rupture as described in Example 2. The results presented below are in terms of the modulus of rupture of the various treatments.

| Soil | P.p.m. TBC in the Soil | MR, millibars |
|---|---|---|
| D | 0 | 1,151 |
| D | 50 | 622 |
| D | 100 | 0 |
| D | 200 | 0 |
| D | 300 | 0 |
| N | 0 | 1,940 |
| N | 50 | 1,775 |
| N | 100 | 661 |
| N | 200 | 0 |
| N | 300 | 0 |
| F | 0 | 2,633 |
| F | 50 | 2,321 |
| F | 100 | 1,780 |
| F | 200 | 615 |
| F | 300 | 0 |

It is apparent from the above results that the presence of a catechol compound in soils of rather widely varying characteristics results in a reduced modulus of rupture and hence improved agricultural suitability of the soil. The results also reveal that even at treatment levels as low as 50 p.p.m. there is an improvement in the soil.

*Example 12*

Four 100-gram samples of a finely ground air-dried slightly acid clay loam soil were prepared. In addition, the following solutions were prepared:

(1) 6 grams of TBC was mixed with 11 grams of triethanolamine and this mixture brought up to 25 ml. with water, thus resulting in the triethanolamine salt of the catechol.

(2) 6 grams of TBC was mixed with 4.5 grams of NaOH and this mixture brought up to 25 ml. with water, thus forming the sodium salt of the catechol compound.

A quantity of 0.0625 ml. of solutions 1 and 2 was each diluted to 10 ml. with water and the resulting solutions sprayed onto and mixed with two separate samples of soil. The third sample of soil was treated with 10 ml. of water in which 15 mg. of TBC was suspended, and the fourth sample was treated with 10 ml. of water. These treated samples were then made into briquettes and the resulting briquettes tested for modulus of rupture as described in Example 2. The results presented below are in terms of the modulus of rupture of the various briquettes.

Catechol compound
    (all contain 150 p.p.m. TBC): MR, millibars
        Triethanolamine salt of TBC _____ 3450
        Sodium salt of TBC _____ 2660
        TBC suspended in water _____ 2470
        Water (control) _____ 6580

It is apparent from the above results that salts of the catechol compounds and water suspensions of these compounds effectively improve the agricultural suitability of soil.

Example 13

The following emulsifiable formulations of TBC were prepared:

(1) 4.8 grams of TBC plus 1 ml. of a proprietary alkyl aryl sulfonate emulsifier diluted to 10 ml. with isopropanol.

(2) 4.8 grams of TBC plus 0.5 ml. of the emulsifier of (1.) above diluted to 10 ml. with isopropanol.

(3) 4.8 grams of TBC plus 1.0 ml. of a proprietary polyhydric alcohol sulfonate emulsifier diluted to 10 ml. with isopropanol.

(4) 4.8 grams of TBC plus 1.0 ml. of sorbitan monolaurate emulsifier diluted to 10 ml. with isopropanol.

(5) 4.8 grams of TBC plus 0.5 ml. of sorbitan monolaurate emulsifier diluted to 10 ml. with isopropanol.

(6) 4.8 grams of TBC plus 1.0 ml. of polyoxyethylene sorbitan monoleate emulsifier diluted to 10 ml. with isopropanol.

(7) 4.8 grams of TBC plus 1.0 ml. of lauric acid alkylolamine condensate emulsifier diluted to 10 ml. with isopropanol.

(8) 4.8 grams of TBC plus 0.5 ml. of lauric acid alkylolamine condensate emulsifier diluted to 10 ml. with isopropanol.

A quantity of 0.042 ml. aliquots of each of the above formulations was suspended individually in eight 10-ml. aliquots of water. Another 10 ml. aliquot of water alone was prepared as a control. The resulting eight water-diluted emulsions and the water control were then sprayed individually onto nine 100-gram samples of a finely ground air-dried slightly acid clay loam soil. These treated samples were then made into briquettes and the resulting briquettes tested for modulus of rupture as described in Example 2. The results presented below are in terms of the modulus of rupture of the various treatments, the numbers corresponding to the treatments listed above.

| Treatment | Volume percent in Catechol Concentrate | Type of Emulsifier | MR, millibars |
| --- | --- | --- | --- |
| 1 | 10 | Anionic | 1,330 |
| 2 | 5 | do | 450 |
| 3 | 10 | do | 1,370 |
| 4 | 10 | Nonionic | 1,570 |
| 5 | 5 | do | 1,050 |
| 6 | 10 | do | 1,870 |
| 7 | 10 | Cationic | 830 |
| 8 | 5 | do | 300 |
| Control | | | 2,550 |

It is apparent from the above results that emulsifiable formulations of catechol compounds effectively improve the agricultural suitability of soil.

Example 14

Three 100-gram samples of a finely ground air-dried slightly acid clay loam soil were prepared. Each sample was then treated with 5 ml. of water. Three solutions containing 20 mg. of TBC in 5 ml. of either acetone, 1,2-dichloroethane or mineral spirits having a boiling range of 90°–138° C. also were prepared. Each solution was then sprayed onto and mixed with separate soil samples. The treated samples were then made into briquettes and the resulting briquettes tested for modulus of rupture as described in Example 2. The results for all three treatments showed a modulus of rupture of zero whereas this same soil normally has a modulus of rupture of about 2500 millibars. It is apparent from these results that different types of solvents are suitable for applying catechol compounds to soil.

Example 15

Great Lakes lettuce and Dwarf Essex rape seeds were planted in a San Joaquin loam having the following composition: 12 percent clay, 38 percent silt, 50 percent sand. This soil had the following additional characteristics: very dry top 2 inches, 0.7 percent organic matter, pH 5.4, temperature 6 inches 65° F.

An 8 weight percent solution of TBC in water was applied to the seed rows by nozzles attached to Planet Jr. planters (shoe type) mounted on the rear bar of a Farmall Cub tractor in such a way that the sprays were directed into the closing furrow or behind the packing wheel directly over the seed. With cone sprays, the sprays were applied so that the edge intersected the soil just below the shoulder of the seed furrow, using Spraying System Conejet nozzles with D series orifices. With fan sprays, the fan in the closing furrow or behind the packer wheel was oriented parallel to the seed row, using Spraying System F jet flat fan nozzles. Both sprays were set so that the spray was delivered no more than ½ inch deep. A thin line of moisture was visible when the furrow closed behind the packer wheel.

The seeds were planted ¾ to 1 inch deep and about 1 inch of water was applied. A packer wheel left a firm, slightly rounded soil surface over the seeds. Fracture lines as percent of total row were measured. The stands (the number of plants per row soon after emergence) were also counted.

The following data were obtained with this high crusting-potential soil:

| Lb. TBC/Acre | Type Spray | Fracture[1] percent of Row | Stand[2] Plants /15 ft. Row | Growth[2] | |
| --- | --- | --- | --- | --- | --- |
| | | | | Lettuce | Rape |
| | | | | Lettuce | Rape |
| 1.3 | Cone | [3]98 | [3]31 | [3]51 | 75 | 93 |
| 2.7 | Cone | [3]97 | 23 | 39 | 50 | 85 |
| 0.7 | Fan | [3]95 | [4]26 | 35 | 70 | 80 |
| 2.7 | Fan | [3]99 | 23 | 20 | 70 | 55 |
| Control | (No Spray) | 59 | 12 | 24 | 40 | 65 |

[1] Lettuce and rape plots combined.
[2] Based on 100 being equal to best plants in experiment and relating the average growth of each plot to best plants on a percentage basis.
[3] Least significant difference 0.01.
[4] Least significant difference 0.05.
Dosages of TBC were based on 30 in. row spacings.

The above data show that stand, growth and fracture line were improved considerably by the TBC as compared with the untreated soil. The plots treated with TBC exhibited a dry streak where the spray was applied long before the rest of the surface became dry.

Example 16

The procedure of Example 1 was repeated, substituting a similar soil sample and another catechol compound. The following data were obtained.

Catechol compound: UCS, p.s.i.
    Control _____ 48
    4-chloro-5-(1,1,3,3-tetramethylbutyl)-
      pyrocatechol _____ 274

Example 17

The procedure of Example 1 was repeated, substituting a similar soil sample and another catechol compound. The following data were obtained.

Catechol compound: UCS, p.s.i.
    Control _____ 170
    Octyl ester of protocatechuic acid _____ 423

Example 18

The procedure of Example 1 was repeated, substituting a similar soil sample and another catechol compound. The following data were obtained.

Catechol compound: UCS, p.s.i.
    Control _____ 140
    N-octyl-5-phenyl-o-pyrocatechuamide _____ 201

Example 19

The procedure of Example 2 was repeated, substituting a similar soil sample and other catechol compounds. The following data were obtained.

| Catechol compound: | MR, millibars |
|---|---|
| Control | 8000 |
| 4-phenoxypyrocatechol | 4750 |
| 3-amino-4-(1,1,3,3-tetramethylbutyl)-pyrocatechol | 5900 |

Example 20

The procedure of Example 2 was repeated, substituting a similar soil sample and another catechol compound. The following data were obtained.

| Catechol compound: | MR, millibars |
|---|---|
| Control | 7500 |
| 4-(isopentylthio)-pyrocatechol | 4950 |

This application is a continuation-in-part of U.S. Patent application Serial No. 55,113, filed September 12, 1960, now abandoned.

What is claimed is:

1. The method of treatment of clays and clay-containing materials by applying to the surface particles thereof a compound having the generic formula

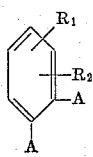
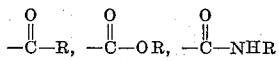

in which A is OM and M is a member of the group consisting of H, NH$_4$, metal and amine, R$_1$ is one of R, —OR, $$-\overset{O}{\underset{\|}{C}}-R, \quad -\overset{O}{\underset{\|}{C}}-OR, \quad -\overset{O}{\underset{\|}{C}}-NHR$$

and —SR in which R is one of alkyl, aryl, alkaryl, aralkyl and cycloalkyl groups containing from 1 to 18 carbon atoms and from 0 to 2 chloro substituents; R$_2$ is one of A, R, H, Cl, NH$_2$ and COOM$_2$ in which M$_2$ is one of hydrogen, alkali metal, methyl and ethyl; and wherein R$_1$ and R$_2$ together may be interconnected to form with the benzene ring a naphthalene ring system; and quinone oxidation products of the foregoing compounds; in amount sufficient to provide at least 0.05 weight percent of said compound, dry clay basis.

2. A mixture of a clay material of the group consisting of clay, clay soils and clay structural material precursors containing at least 0.05 weight percent of a catechol compound having the generic fromula

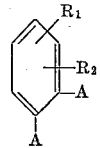

in which A is OM and M is a member of the group consisting of H, NH$_4$, metal and amine; R$_1$ is one of R, —OR, $$-\overset{O}{\underset{\|}{C}}-R, \quad -\overset{O}{\underset{\|}{C}}-OR, \quad -\overset{O}{\underset{\|}{C}}-NHR$$

and —SR in which R is one of alkyl, aryl, alkaryl, aralkyl and cycloalkyl groups containing from 1 to 18 carbon atoms and from 0 to 2 chloro substituents; R$_2$ is one of A,R,H,Cl, NH$_2$ and COOM$_2$ in which M$_2$ is one of hydrogen, alkali metal, methyl and ethyl; and wherein R$_1$ and R$_2$ together may be interconnected to form with the benzene ring a naphthalene ring system; and quinone oxidation products of the foregoing compounds; said clay material containing at least 5 weight percent of clay, dry weight basis.

3. The mixture of claim 2 in which the clay material contains at least 5 weight percent clay, dry basis, and from 1 to 100 weight percent of at least one member of the group consisting of Portland cement and lime, clay material basis.

4. The mixture of claim 2 in which the catechol compound is 4-tert.-butylpyrocatechol.

5. The mixture of claim 3 in which the catechol compound is 4-tert.-butylpyrocatechol.

6. The mixture of claim 2 in which the catechol compound is 4-sec.-butylpyrocatechol.

7. The mixture of claim 2 in which the catechol compound is 4-phenylpyrocatechol.

8. The mixture of claim 2 in which the catechol compound is 4-dodecylpyrocatechol.

9. The mixture of claim 2 in which the catechol compound is 4-(1,1,3,3-tetramethylbutyl)-pyrocatechol.

References Cited in the file of this patent
UNITED STATES PATENTS

| 2,109,858 | Cannon | Mar. 1, 1938 |
| 2,676,947 | Parker | Apr. 27, 1954 |
| 2,732,300 | Thirtle | Jan. 24, 1956 |
| 2,838,877 | Working | June 17, 1958 |

FOREIGN PATENTS

| 559,390 | Canada | June 24, 1958 |
| 775,908 | Great Britain | May 29, 1957 |

OTHER REFERENCES

Rogers: "Composition and Properties of Oil Well Drilling Fluids," published 1953 by Gulf Publishing Co., Houston, Texas (pages 319–322).